US012342139B2

(12) United States Patent
Middleton et al.

(10) Patent No.: US 12,342,139 B2
(45) Date of Patent: Jun. 24, 2025

(54) INCREASING LOW FREQUENCY EXTENSION FOR MICROSPEAKERS USING A VOLUME DEPENDENT LINKWITZ TRANSFORM AND MULTIBAND COMPRESSOR

(71) Applicant: Microsoft Technology Licensing, LLC

(72) Inventors: Eric Middleton, Redmond, WA (US); Kevin Venalainen, Redmond, WA (US); Christopher Borowski, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 17/928,303

(22) PCT Filed: May 21, 2021

(86) PCT No.: PCT/US2021/033591
§ 371 (c)(1),
(2) Date: Nov. 29, 2022

(87) PCT Pub. No.: WO2021/247252
PCT Pub. Date: Dec. 9, 2021

(65) Prior Publication Data

US 2023/0209257 A1 Jun. 29, 2023

(30) Foreign Application Priority Data

Jun. 3, 2020 (NL) ...................................... 2025740

(51) Int. Cl.

| | |
|---|---|
| ***H04R 3/04*** | (2006.01) |
| ***H04R 1/02*** | (2006.01) |
| ***H04R 29/00*** | (2006.01) |

(52) U.S. Cl.
CPC ............... *H04R 3/04* (2013.01); *H04R 1/025* (2013.01); *H04R 29/001* (2013.01); *H04R 2430/01* (2013.01); *H04R 2430/03* (2013.01)

(58) Field of Classification Search
CPC ........ H04R 3/04; H04R 1/025; H04R 29/001; H04R 2430/01; H04R 2430/03
(Continued)

(56) References Cited

U.S. PATENT DOCUMENTS

| | | | |
|---|---|---|---|
| 8,903,109 | B2 | 12/2014 | Vickers |
| 10,200,003 | B1 | 2/2019 | Slotnick |
| 2018/0014121 | A1 | 1/2018 | Lawrence et al. |

FOREIGN PATENT DOCUMENTS

| | | | |
|---|---|---|---|
| WO | 2018167538 | A1 | 9/2018 |

OTHER PUBLICATIONS

"2X4 HD Compact 2-In 4-Out High-Resolution Audio Processor", Retrieved From: https://web.archive.org/web/20190730083708/https://www.parts-express.com/pedocs/manuals/230-324--minidsp-2x4-hd-usb-dac-digital-signal-processor-manual.pdf, Jul. 30, 2019, 47 Pages.
(Continued)

*Primary Examiner* — Vivian C Chin
*Assistant Examiner* — Douglas J Suthers
(74) *Attorney, Agent, or Firm* — NovoTechIP International PLLC

(57) ABSTRACT

Techniques performed by a data processing system for operating a speaker disposed within a sealed enclosure herein include obtaining a first input signal to be output by the speaker; determining a first volume level associated with the first input signal; selecting a first Linkwitz Transform and a first Multiband Compressor (MBDRC) from volume-dependent configuration data based on the first volume level; generating a first intermediate signal by applying the first Linkwitz Transform to the first input signal to increase a
(Continued)

low-frequency response of the speaker; generating a first output signal by applying the first MBDRC to the first intermediate signal by compressing the at least a portion of the first intermediate signal; and driving the speaker to produce first audio output using the first output signal.

17 Claims, 8 Drawing Sheets

(58) Field of Classification Search
USPC ........................................................... 381/59
See application file for complete search history.

(56) References Cited

OTHER PUBLICATIONS

Gunnarsson, Viktor, "Assessment of Nonlinearities in Loudspeakers", In Master's Thesis of Chalmers University of Technology, 2010, 72 Pages.

MacBeth, et al., "Digitally Controlled Analog Provides a New Methodology for Embedded Systems in Subwoofer Applications", Retrieved From: https://www.eetimes.com/digitally-controlled-analog-provides-a-new-methodology-for-embedded-systems-in-subwoofer-applications/, Sep. 27, 2004, 4 Pages.

MacBeth, et al., "Novel Subwoofer Signal Conditioner Design Using a Field Programmable Analog Array and Software Tools", In Proceedings of 117th Audio Engineering Society Convention, Oct. 28, 2004, 10 Pages.

Mellor, Nyal, "What do people think about EMM Labs?", Retrieved From: https://www.whatsbestforum.com/threads/what-do-people-think-about-emm-labs.9415/, Jan. 23, 2013, 11 Pages.

"Search Report Issued in Netherlands Patent Application No. N2025740", Mailed Date: Feb. 24, 2021, 11 Pages.

"International Search Report and Written Opinion Issued in PCT Application No. PCT/US21/033591", Mailed Date: Aug. 27, 2021, 13 Pages.

Vickers, Earl, "The Non-Flat and Continually Changing Frequency Response of Multiband Compressors", In Proceedings of 129th Audio Engineering Society Convention, Nov. 4, 2010, 16 Pages.

INCREASING LOW FREQUENCY EXTENSION FOR MICROSPEAKERS USING A VOLUME DEPENDENT LINKWITZ TRANSFORM AND MULTIBAND COMPRESSOR

BACKGROUND

Speakers disposed within a sealed enclosure will experience a reduction in low frequency output caused by the resonance of the driver with the air within the enclosure. In a microspeaker, this resonance is typically much higher than a standard full range driver. Microspeakers are commonly used in portable computing devices, such as but not limited to mobile phones, laptop computing devices, tablet computing devices, wearable computing devices, and portable game consoles, where the size and/or form factor of the device limits the size of the speakers that may be integrated into the device. Thus, there are significant areas for new and approved mechanisms for compensating for such a reduction in low frequency output to provide improved low frequency output for such speakers.

SUMMARY

A data processing system according to the disclosure includes a speaker, a processor, and a computer-readable medium. The computer-readable medium stores executable instructions for causing the processor to perform operations including obtaining a first input signal to be output by the speaker; determining a first volume level associated with the first input signal; selecting a first Linkwitz Transform and a first Multiband Compressor (MBDRC) from volume-dependent configuration data based on the first volume level; generating a first intermediate signal by applying the first Linkwitz Transform to the first input signal to increase a low-frequency response of the speaker; generating a first output signal by applying the first MBDRC to the first intermediate signal by compressing the at least a portion of the first intermediate signal; and driving the speaker to produce first audio output using the first output signal.

An example method for operating a speaker disposed within a sealed enclosure according to the disclosure includes obtaining a first input signal to be output by the speaker; determining a first volume level associated with the first input signal; selecting a first Linkwitz Transform and a first Multiband Compressor (MBDRC) from volume-dependent configuration data based on the first volume level; generating a first intermediate signal by applying the first Linkwitz Transform to the first input signal to increase a low-frequency response of the speaker; generating a first output signal by applying the first MBDRC to the first intermediate signal by compressing at least a portion of the first intermediate signal; and driving the speaker to produce first audio output using the first output signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
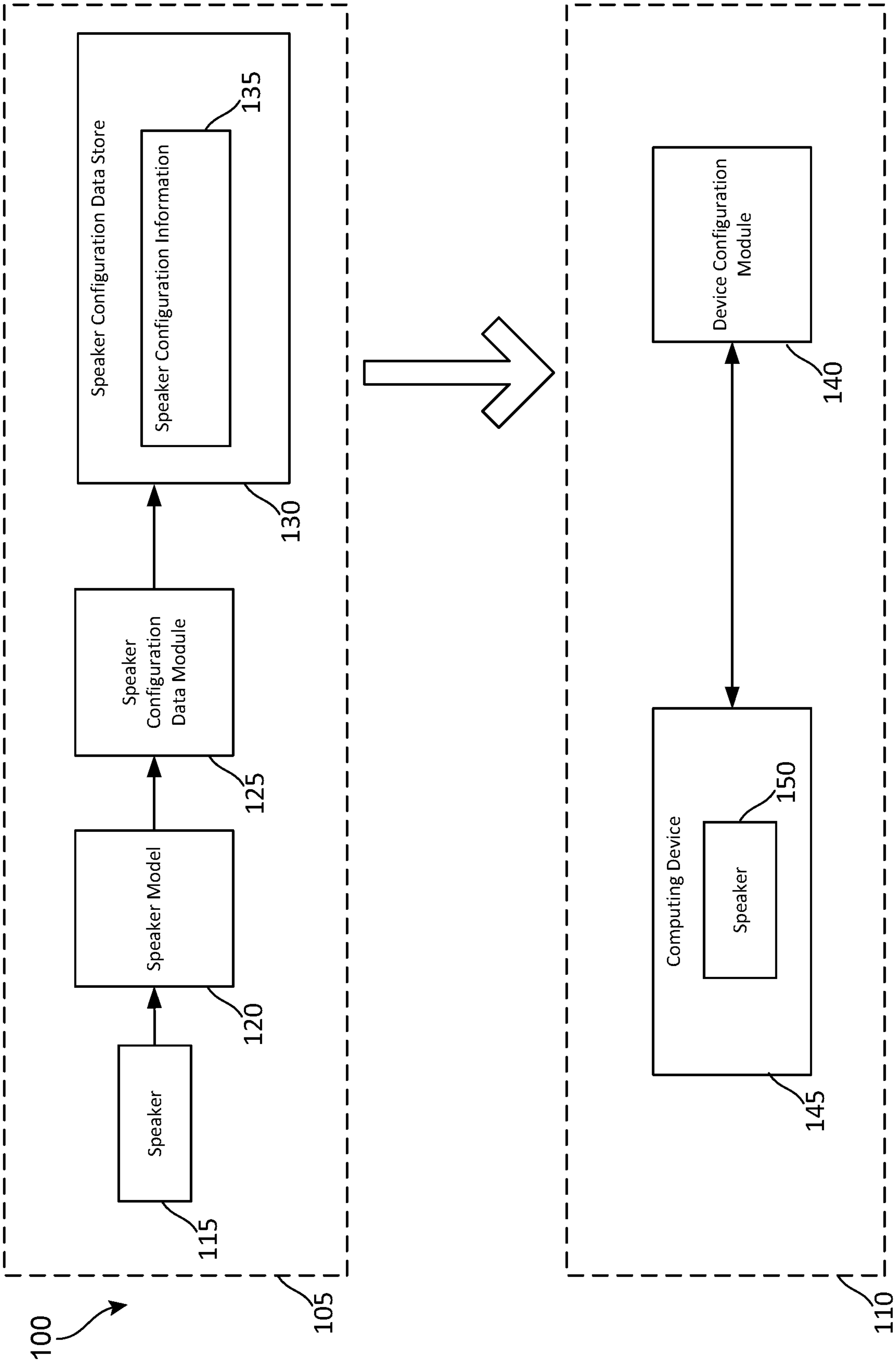
FIG. 1 is a block diagram showing a computing environment 100 in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for compensating for a reduction in low frequency output in speakers disposed in a sealed enclosure are provided. These techniques solve the technical problem in which speakers disposed within a sealed enclosure will experience a reduction in low frequency output caused by the resonance of the driver with the air within the enclosure. In a microspeaker, this resonance is typically much higher than a standard full range driver. The techniques disclosed herein provide a technical solution to this problem by compensating for this reduction in low frequency output to provide improved low frequency output for such speakers. These techniques use a set of volume-dependent Linkwitz transforms (LT) and a set of volume-dependent Multiband Compressors (MBDRC) to optimally process the audio for each of a set of different device volume levels.

A Linkwitz Transform is a method for cancelling out the driver-enclosure resonance in the audio signal and replacing it with a much lower frequency resonance, effectively emulating a larger speaker with better low frequency response.

A dynamic range compressor is an algorithm that applies a different level of gain to a signal based on the level of that signal. A multiband compressor splits the audio stream through a filter bank, applies a compressor on each stream, then mixes the result back together. At a given volume level, the LT is configured to provide the lowest frequency extension using the available volume headroom, plus a configurable amount of overboost. The MBDRC for that volume level is configured to only apply compression to frequency bands that are being overboosted by the LT while leaving the other bands uncompressed. Furthermore, the amount of compression applied by the MBDRC is volume-dependent, and the MBDRC does not compress as aggressively at higher volume levels.

The techniques disclosed herein provide distinct advantages over conventional approaches to improving bass extension. One approach utilizes a low shelf filter. The low shelf filter is similar to an LT filter, but the low shelf filter is not exactly matched to cancel out the resonances of the speaker. The low shelf filter is instead an approximation. Accordingly, this approach alone cannot provide as much bass extension as the techniques disclosed herein, because the low shelf filter cannot use more headroom that is available. Most musical content is not a full scale most of time, and the use of the low shelf filter does not take advantage of this to improve bass extension. Another conventional approach is to use a single MBDRC that is configured to extend the low frequency response as low as possible based on a real content signal level. However, this approach is limited compared to the techniques disclosed herein, because the single MBDRC approach will noticeably compress audio content at higher volume levels. In contrast, the techniques disclosed herein use a volume dependent MBDRC which will not compress as aggressively at higher volume levels.

FIG. 1 is a block diagram showing a computing environment 100 in which the techniques disclosed herein may be implemented. The computing environment 100 is divided into a development environment 105 and a deployment environment 110. In the development environment 105, the speaker configuration information 135 is generated based on a speaker model 120 of a speaker 115. In the deployment environment 110, the speaker configuration information 135 is deployed to a computing device 145 to operate a speaker 150 of the computing device 145. The speaker 150 of the of the computing device 145 is of the same type as the speaker 115, and the speaker configuration information 135 may be used to operate the speaker 150 to cancel out the driver-enclosure resonance in the audio signal and provide a much lower frequency resonance. Using this approach, the speaker 150 of the computing device 145 may emulate a larger speaker with better low frequency response. The development environment 105 and the deployment environment 110 of the computing environment 100 may be implemented by the same or by separate entities. For example, a manufacturer of the computing device 140 may implement both the development environment 105 and the deployment environment 110. Alternatively, a manufacturer of the speaker 150 may implement the development environment 105 in which the speaker configuration information 135 is generated, and a separate entity, such as a manufacturer of the computing device 145 may implement the deployment environment 110.

The development environment 105 may include a speaker 115, a speaker model 120, a speaker configuration data module 125, and a speaker configuration data store 130. The development environment 105 may be implemented on one or more data processing systems. The data processing systems may be a local data processing system that is present in a location where the speaker 115 is being tested to produce the speaker model 120. Alternatively, the development environment 105 may include one or more remote data processing systems, such as one or more server devices.

The speaker 115 is a microspeaker disposed within a sealed enclosure. The speaker 115 may experience a reduction in low frequency output caused by the resonance of the driver within the enclosure. The speaker model 120 may be determined based on design parameters determined during the speaker design process. Alternatively, the speaker performance may be tested for a predetermine range of frequencies to determine the speaker response. The speaker model 120 may be stored in a persistent data store, such as the speaker configuration data store 130. The speaker configuration data store 130 may be a database or other persistent data store that is configured to store one or more speaker models, such as the speaker model 120, and speaker configuration information, such as the speaker configuration information 135. The speaker configuration information 135 may be derived from speaker model 120 by the speaker configuration data module 125. The speaker model 120 may provide a model of the frequency response of the speaker for each of a plurality of volume levels. The speaker model 120 may be used to predict the frequency response of the speaker 115 over a predetermined frequency range in response to a test input signal. The frequency response of the of the speaker 115 may be predicted for multiple volume levels.

The speaker configuration data module 125 may be configured to analyze the speaker model 120 and to output speaker configuration information 135, which may be stored in the speaker configuration data store 130. The speaker configuration information 135 may include configuration information that may be used for driving the speaker at each of the multiple volume levels. The speaker configuration information 135 may include Linkwitz Transform (LT) information and Multiband Compressor (MBDRC) information for each of plurality of volume levels. The LT information and the MBDRC information can be used to compensate for the reduction in the low frequency output caused by the resonance of the driver within the enclosure for each volume level. LT information and MBDRC information are included for each of the volume levels because the reduction in low frequency output is impacted by the volume level of the output.

The LT information includes a Linkwitz Transform configured to receive a signal input at a respective volume level and to generate an intermediate signal input in which a low-frequency response of the speaker is increased. The speaker model 120 provides a mathematical description of the speaker 115 that defines the frequency response of the speaker 115 over a range of frequencies. As discussed above, the speaker 115 is an enclosed speaker that is subject to driver-enclosure resonance in the audio signal which causes low frequency rolling off of the frequency response. The term “roll off” or “rolling off” as used herein refers to a reduction in frequency response.

Figure 2:
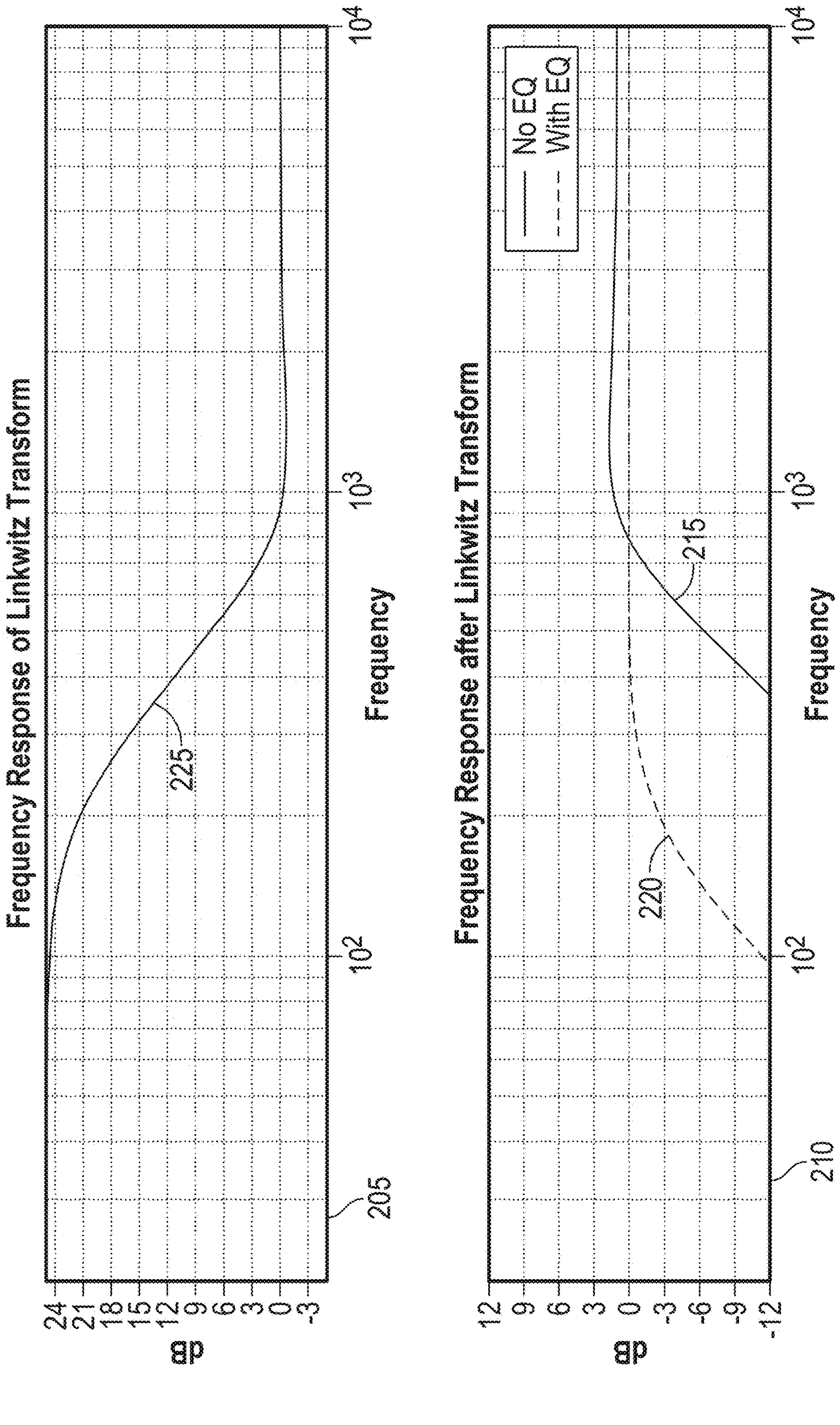
FIG. 2 is a diagram that includes a first chart providing a plot of an example Linkwitz Transform and a second chart providing plots of an example speaker response with and without the Linkwitz Transform applied.

FIG. 2 illustrates and example of such a low frequency rolling off. The graph 210 shows a representation of the frequency response of an example speaker, such as the speaker 115. The graph 210 plots the frequency along the X-axis (horizontal axis) and the speaker output in decibels (dB) along the Y-axis (vertical axis). The curve 215 represents the speaker response before applying the Linkwitz Transform. As can be seen from the curve 215, the speaker output drops rapidly as the frequency decreases, while in an ideal situation, the frequency response should remain relatively flat across the frequency domain. The shape of the curve 215 is characterized by two parameters associated with the speaker model: the tuning frequency (F) and the quality factor (Q). The Linkwitz Transform is a mathematical operation that can be applied to the speaker model 120 to change the effective F and Q values of the speaker model 120 to different values that provide an improved low frequency response. For example, the F value may be decreased to provide greater bass output and/or the Q value may be decreased to cause the speaker model 120 to behave as if the speaker enclosure were larger. Decreasing the Q value effectively reduces the impact of resonance of the driver with air in the speaker enclosure. The graph 205 of FIG. 2 illustrates an example curve 225 of a Linkwitz Transform which can be used to boost low the low frequency response by applying more gain at lower frequencies. The graph 210 includes an example curve 220, which shows the improved low frequency response after the Linkwitz Transform has been applied.

Figure 4:
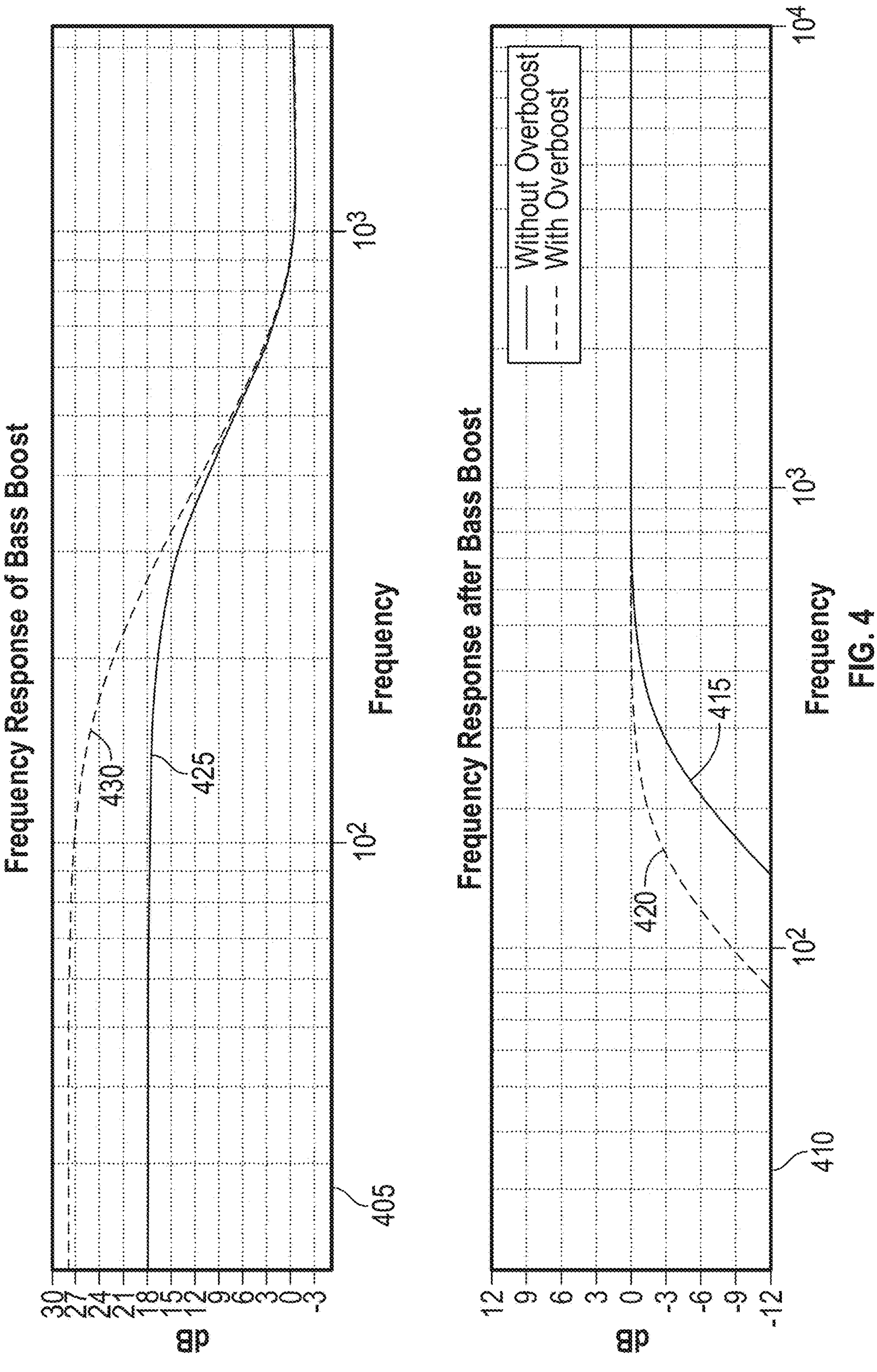
FIG. 4 is a diagram that includes a first chart providing a plot of an example Linkwitz Transform with and without overboost and a second chart providing plots of an example speaker response with and without the overboosted Linkwitz Transform applied.

The MBDRC may apply a further boost to the intermediate signal output by the LT. The MBDRC may analyze the actual content of the audio signal in real time and can add an additional boost in gain (also referred to herein as a "overboost") to the audio signal that has already been boosted by the LT. The MBDRC may consider the amount of headroom within a particular frequency range, the MBDRC may boost the gain up to the amount of headroom. The MBDRC may boost the gain more where there is more headroom and boost the gain less where there is less available headroom. FIG. 4 illustrates an example of such an overboost. The graph 405 shows a plot 425 of an example Linkwitz Transform and a plot 430 of the Linkwitz Transform with the overboost applied. As can be seen from the examples illustrated in FIG. 4, the overboost further boosts the lower frequencies to provide further improved low frequency response. The graph 410 shows a plot 415 of the frequency response curve of an example speaker 115 and a plot 420 of the frequency response curve of the example speaker 115 with the overboosted Linkwitz Transform 430 having been applied to improve the low frequency response of the speaker 115.

Figure 3:
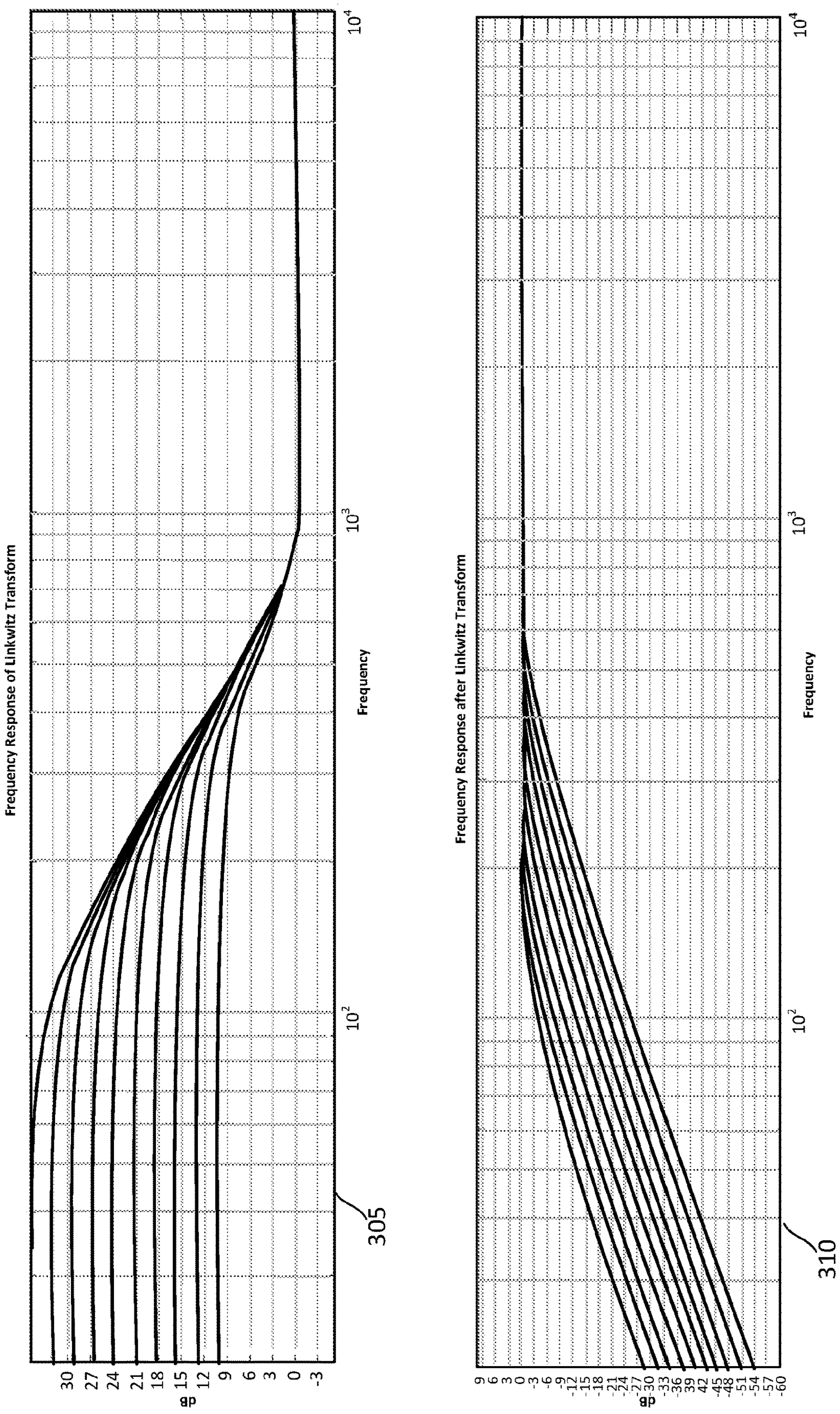
FIG. 3 is a diagram that includes a first chart providing a plot of multiple volume-dependent example Linkwitz Transforms and a second chart providing plots of an example speaker response at each of the volumes with the Linkwitz Transform applied.

The speaker configuration data module 125 may be configured to generate multiple LT transforms as illustrated in FIG. 3. The graph 305 illustrates an example of volume specific Linkwitz Transforms that may be used boost the low frequency response of the speaker 115 at each volume level of a set of volume levels. As can be seen in the graph 305, the curve associated with the Linkwitz Transforms boosts the low frequency response less for lower volume levels and more for higher volume levels. The graph 310 of FIG. 3 illustrates the resulting speaker response curves after the Linkwitz Transforms have been applied to at each volume level. The low frequency response has been improved for each of the volume levels. The number of volume levels for which the LT is calculated may vary from implementation to implementation. The number of levels may be determined based on a signal threshold of the speaker divided by a predetermined number of volume intervals. In other implementations, each interval may be a predetermined decibel increment. In other implementations, the number of intervals may be specified by a user. For example, the data processing system may provide a user interface that allows the user to configure one or more attributes of the speaker configuration information 135, including but not limited to the number of volume levels for which the Linkwitz Transforms are to be determined.

At a given volume level, the LT is configured to provide the lowest frequency extension using the available volume headroom, plus a configurable amount of overboost. This overboost may result in the generation of an intermediate signal output that exceeds the signal threshold of the speaker. As a result, portions of an audio signal that exceed the signal threshold of the speaker may be clipped where portions of the audio signal that exceed the signal threshold are limited to the signal threshold of the speaker. Clipping may introduce significant amounts of distortion into the audio output of the speaker.

The speaker configuration data module 125 also addresses the overboosting problem by configuring a Multiband Compressor (MBDRC) for each volume level that processes the intermediate signal output by the LT. The MBDRC splits the frequency domain of the speaker 115 into multiple frequency bands. The number of frequency banks that the frequency domain may be divided into may be configurable. For example, the data processing system may provide a user interface in which the user may configure one or more attributes of the speaker configuration information 135, including but not limited to the number of frequency bands into which the frequency domain of the speaker 115 may be subdivided. The MBDRC may alter the dynamic range of the signal in each frequency band by reducing the volume of louder parts of the signal and/or by amplifying the quieter parts of the signal. Thus, the MBDRC may identify frequency bands of the intermediate signal output by the LT that are overboosted and may compress those signals sufficiently so that they do not exceed the dynamic range of the speaker and end up being clipped. The MBDRC outputs a calibrated signal based on the intermediate signal in which the overboosted frequency bands have been compressed. The MBDRC is configured to only apply compression to frequency bands that are being overboosted for that volume level by the LT while leaving the other bands uncompressed for that volume level. The speaker configuration data module 125 is configured to add MBDRC configuration information for each volume level to the speaker configuration information 135.

Referring to FIG. 1, the deployment environment 110 may be implemented on one or more data processing systems. As discussed above, the deployment environment 110 may be implemented by the same entity as the development environment 105, while in other implementations separate entities may implement the development environment 105 and the deployment environment 110. The deployment environment 110 includes a device configuration module 140 that may be implemented as an application on a data processing system. The device configuration module 140 may be configured to configure a computing device 145 that includes a speaker 150, which is the same type of speaker as speaker 115. The device configuration module may obtain from the speaker configuration data store 130 a copy of the speaker configuration information 135 for the speaker 150. In some implementations, the speaker configuration data store 130 may be located on a remote servers or servers from the device configuration module 140. The device configuration module 140 may be configured to send a request to the speaker configuration data store 130 over one or more networks to obtain the speaker configuration information 135. In some implementations, the speaker configuration data store 130 may be configured to store speaker configuration information 135 for multiple types of speakers, and the device configuration module 140 may be configured to send a request to the speaker configuration data store 130 to obtain the speaker configuration information 135 for a particular type of speaker.

The computing device 145 may be a mobile phone, a tablet computing device, a wearable computing device, a portable game console, a portable speaker device, or other electronic device, where the size and/or form factor of the device limits the size of the speakers that may be integrated into the device. The computing device 145 may include hardware and/or software elements for driving the speaker 150. The device configuration module 140 may be configured to use the speaker configuration information 135 to configure hardware and/or software-based digital signal processing elements of the computing device 145 to use the volume specific LT and MBDRC to provide improved low frequency response for the speaker 150 of the computing device 150.

Figure 5:
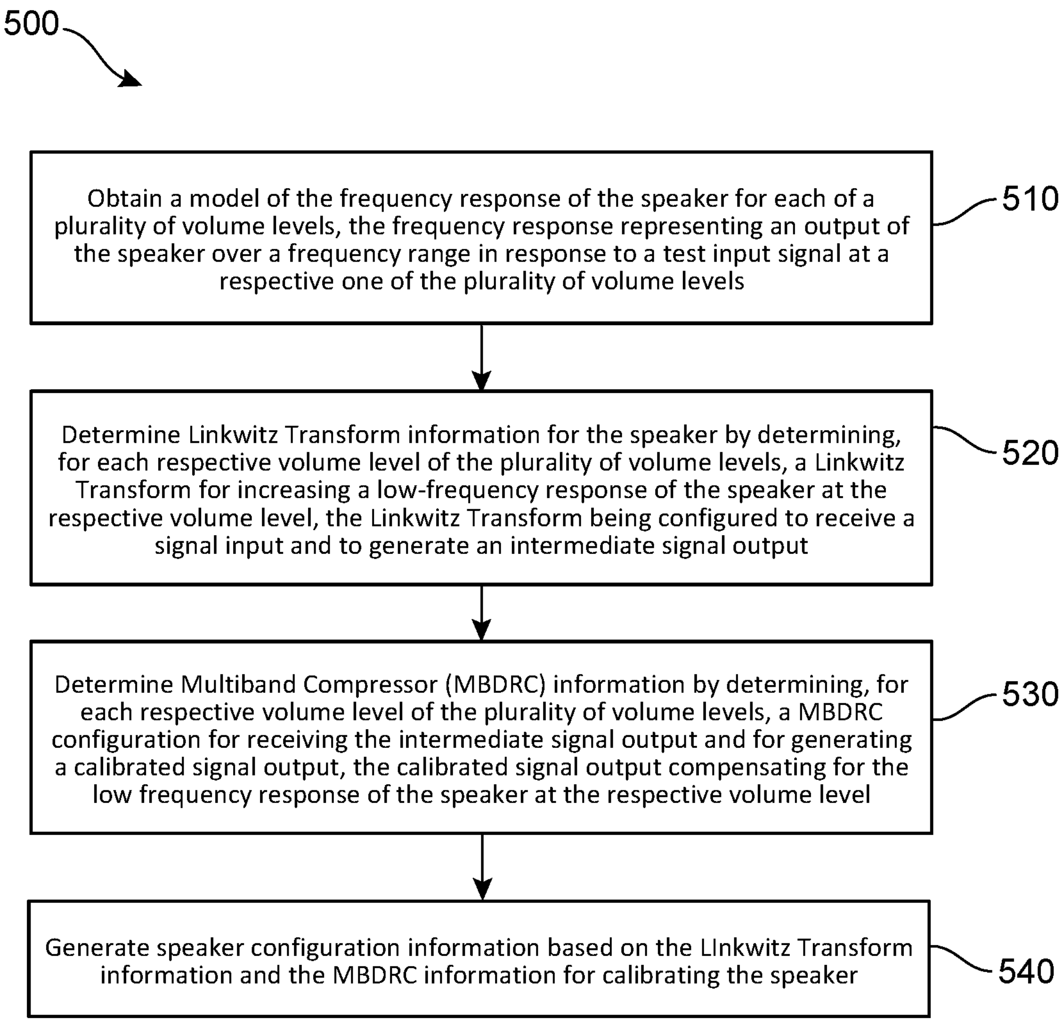
FIG. 5 is a flow chart of an example process executed by a data processing system for generating configuration information for a speaker located within an enclosure.

FIG. 5 is a flow diagram of a process 500 that may be implemented by the data processing system for generating speaker configuration information, such as the speaker configuration information 135. The process 500 may be implemented by the development environment 105 described above in FIG. 1. The process 500 may be used to generate speaker configuration information 135 that may be used when operating the speaker 150 of the computing device 145 to provide for improve low frequency output by the speaker 150.

The process 500 may include an operation 510 of obtaining a model of the frequency response of the speaker for each of a plurality of volume levels. The frequency response represents an output of the speaker over a frequency range in response to a test input signal at a respective one of the plurality of volume levels. FIG. 2 illustrates an example of such a frequency response in the graph 210. The plot 215 shows an example of the reduction in low frequency output caused by the resonance of the driver with the air within the enclosure.

The process 500 may include an operation 520 of determining Linkwitz Transform information for the speaker including, for each respective volume level of the plurality of volume levels, a Linkwitz Transform for increasing a low-frequency response of the speaker at the respective volume level. The Linkwitz Transform receives a signal input and to generates an intermediate signal output. The LT is configured to use available volume headroom to boost the low frequency response of the speaker 115. The LT may also add a configurable amount of overboost to further increase the low frequency response of the speaker 115. The overboost amount may be defined in terms of decibels and may be added to the overall signal output of the LT to provide an additional boost to the low frequency performance. The overboost may be specified in the model information 120 in some implementations. In other implementations, the data processing system on which the process 500 is performed may provide a user interface that allows a user to input a value for the overboost parameter. As a result of the overboost, the intermediate signal may exceed a signal threshold capability of the speaker 115 for at least a portion of the frequency domain of the speaker 150.

The process 500 may include an operation 530 of determining Multiband Compressor (MBDRC) information including, for each respective volume level of the plurality of volume levels, a MBDRC configuration configured to receive the intermediate signal output and to generate a calibrated signal output, the calibrated signal output compensating for the low frequency response of the speaker at the respective volume level. The MBDRC may subdivide the frequency domain of the speaker into a plurality of frequency bands. Each band may be compressed by the MBDRC, as necessary, to prevent the signal within that frequency band from exceeding the signal threshold of the speaker 115. The signal threshold of the speaker 115 may be defined in the speaker model 120.

The process 500 may include an operation 540 of generating speaker configuration information based on the Linkwitz Transform information and the MBDRC information for calibrating the speaker. The speaker configuration information 135 described above may be output and stored in the speaker configuration data store 130. An entity configuring a computing device 145 that includes a speaker 150 that is of the same or similar type as the speaker 115 for which the LT and MBDRC configuration information was determine may obtain the speaker configuration information 135 and use that information to configure the computing device 145 to utilize the speaker configuration information 135 when operating the speaker 150.

Figure 6:
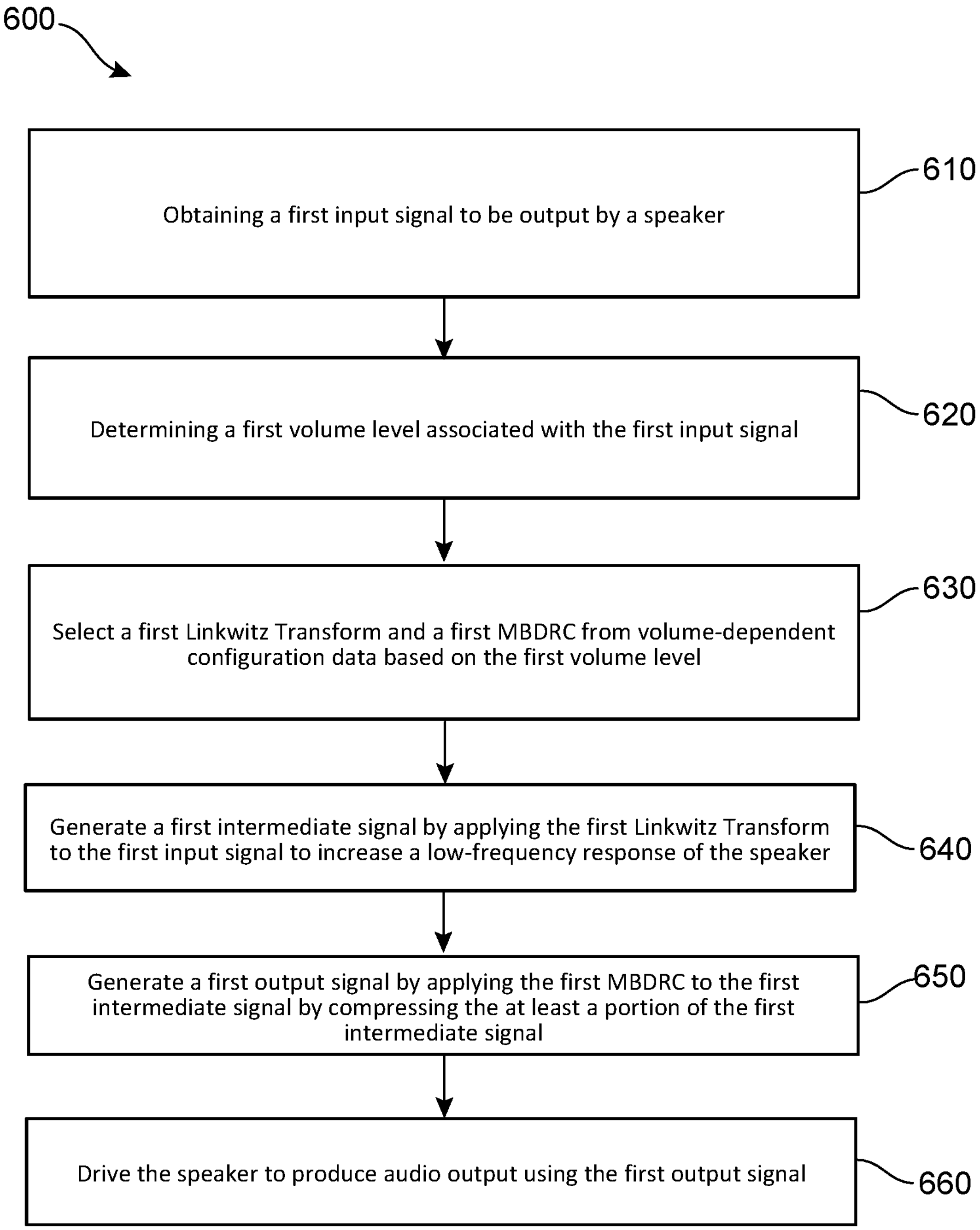
FIG. 6 is a flow chart of an example process executed by a data processing system for operating a speaker disposed within a sealed enclosure.

FIG. 6 is a flow diagram of a process 600 that may be implemented by the data processing system for operating a speaker of a computing device using speaker configuration information, such as the speaker configuration information 135. The process 600 may be implemented by the computing device 145. In the process 600, the speaker configuration information 135 generated by the process 600 may be used to operate the speaker 150 of a computing device 145. The speaker configuration information 135 may include volume-specific pairs of Linkwitz Transforms and MBDRCs that process an input signal to be output by the speaker 150 to provide improved low frequency output by the speaker 150.

The process 600 may include an operation 610 of obtaining a first input signal to be output by a speaker 150 of a computing device 145. The speaker 150 is disposed within a scaled enclosure and may experience a reduction in low frequency output caused by resonance of the speaker driver with air in the enclosure. The computing device 145 may be a portable computing device, such as but not limited to a mobile phone, a tablet computing device, a laptop computing device, a wearable computing device, or portable game consoles, where the size and/or form factor of the device limits the size of the speakers that may be integrated into the device. Thus, the speaker 150 may be a microspeaker to fit within the form factor of such a computing device. The small size of the sealed enclosures of such speakers may be impacted by resonance of the speaker driver with air within the enclosure more significantly than speakers having a larger enclosure.

The process 600 may include an operation 620 of determining a first volume level associated with the first input signal. The first volume level may a device volume level set by a user of the device and/or set automatically by a software or hardware component of the device. The device volume level may by selected by a user via a software user interface of the computing device 145. For example, where the computing device 145 is a tablet computing device or a laptop computing device, the computing device 145 may provide a graphical user interface for controlling the volume of audio output by the computing device. The volume control user interface may be rendered on a touchscreen that permits the graphical user interface to be manipulated via tactile input. The volume control user interface may be rendered on a non-touch screen and the graphical user interface may be controlled via a mouse or other inputs means. In other implementations, the computing device 145 may include one or more physical control knobs, buttons, sliders, switches, or other physical control means that may be used to adjust the volume of audio output of the computing device 145. The volume level information may be obtained from an operating system of the computing device 145 and/or determined by hardware and/or software based digital signal processing components that are configured to process digital audio content and output analog audio signal to the driver of the speaker 150.

The process 600 may include an operation 630 of selecting a first Linkwitz Transform and a first MBDRC from volume-dependent configuration data 135 based on the first volume level. The computing device 145 may include the volume-dependent configuration data in speaker configuration information 135 that may have been generated using the various techniques disclosed in the preceding examples. The speaker configuration information 135 may include parameters that may be used to configured hardware and/or software-based digital signal processing components that can implement the Linkwitz Transform and the MBDRC. The speaker configuration information 135 may include parameters that may be used to configure the LT and MBDRC for execution by digital signal processing components of the computing device 145. As discussed in the preceding examples, the speaker configuration information 135 may be implemented as a lookup table that is indexed by volume level. The computing device 145 may look up a volume specific entry associated with a volume level that is closest to the device volume level determined in the operation 620. In some implementations, the computing device 145 may be configured to round up to the next nearest volume level or to round down to the next nearest volume level. Once an entry in the lookup table has been determined, the configuration parameters for the LT and MBDRC associated with that entry may be obtained.

The process 600 may include an operation 640 of generating a first intermediate signal by applying the first Linkwitz Transform to the first input signal to increase a low-frequency response of the speaker. The first input signal obtained in operation 610 may be processed using the Linkwitz Transform that was determined in operation 630. The output from the first Linkwitz Transform boosts the low frequency response and may include an overboost component that may cause at least a portion of the first intermediate signal resulting from the first LT to exceed the signal threshold of the speaker 150, which would result in those portions of the first intermediate signal being clipped. This would result in distortion in the signal that would degrade the quality of the audio output by the speaker 150. However, the MBDRC may resolve this issue through selective compression those portions of the intermediate signal that exceed the signal threshold of the speaker 150.

The process 600 may include an operation 650 of generating a first output signal by applying the first MBDRC to the first intermediate signal by compressing the at least a portion of the first intermediate signal. As described in the preceding examples, the MBDRC may divide the frequency domain of the speaker into a plurality of frequency bands. The configuration parameters for the volume level may define which frequency bands are to be used for that respective volume level. The MBDRC receives the first intermediate signal output by the LT, divides the first intermediate signal into the specified frequency bands, and applies compression to those frequency bands of the first intermediate signal that would otherwise exceed the signal threshold of the speaker 150. The MBDRC mixes the frequency bands back to together and outputs a first output signal. As a result, the computing device 145 may utilize much smaller sized speakers that fit within the compact form factor of the computing device without having to sacrifice on audio quality.

The process 600 may include an operation 660 of driving the speaker to output audio content using the first output signal. The first output signal provides improved low frequency response resulting from the LT and MBDRC processing of the first input signal. The speaker 150 may then provide significantly improved frequency response that would otherwise not be realized without the processing by the LT and MBDRC.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
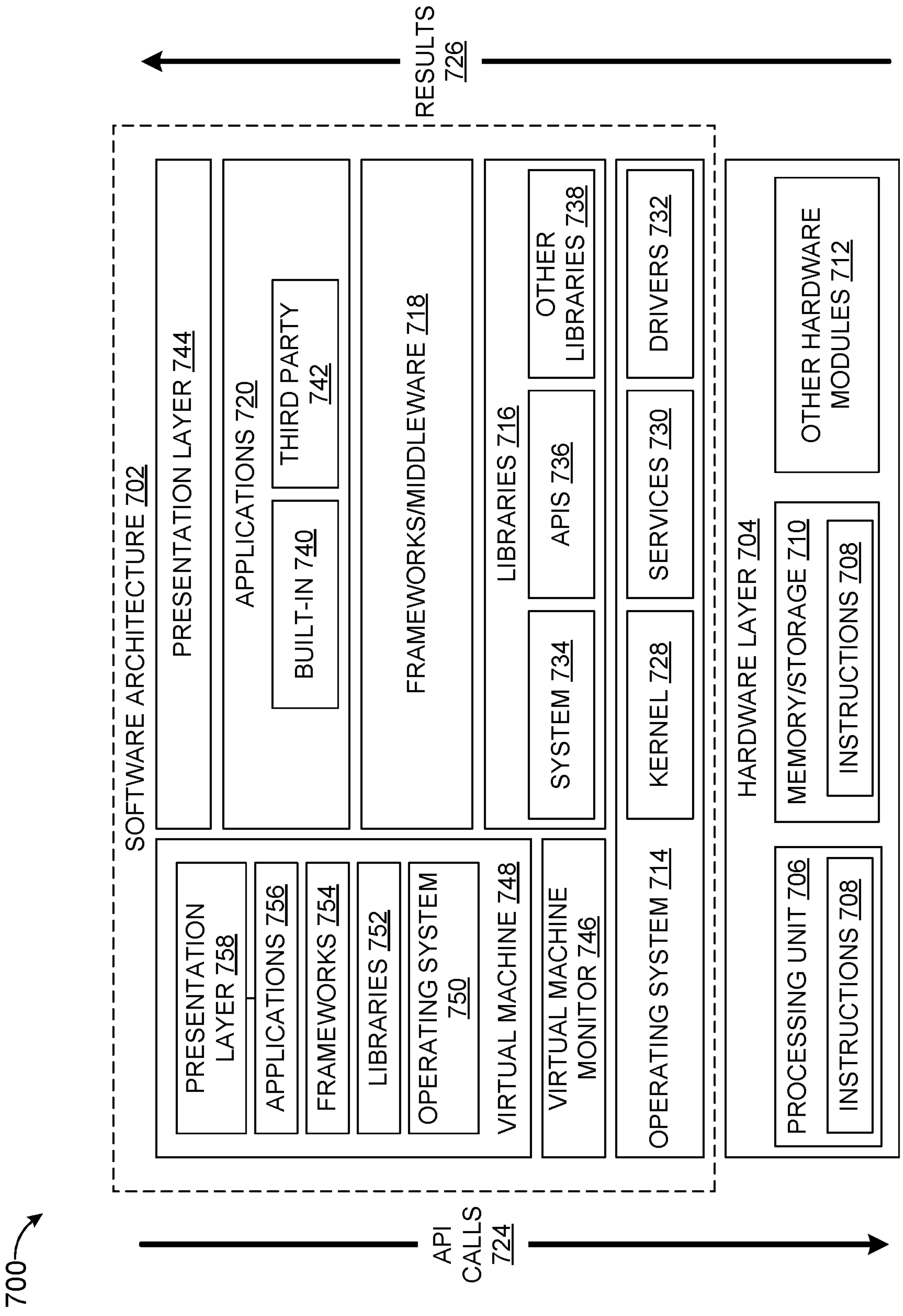
FIG. 7 is a block diagram illustrating an example software architecture, various portions of which may be used in conjunction with various hardware architectures herein described, which may implement any of the features herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
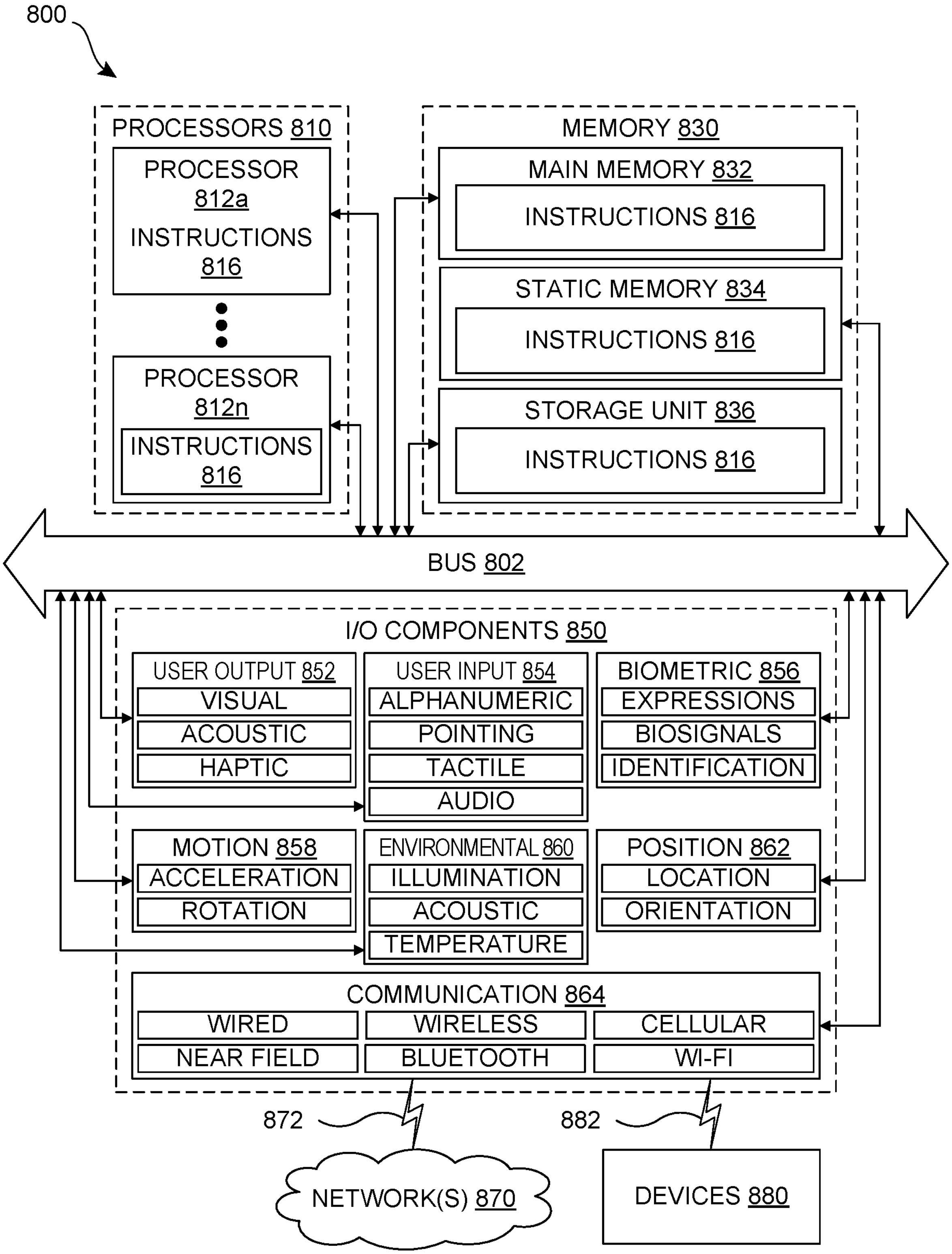
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
- a speaker disposed in a sealed enclosure;
- a processor; and
- a computer-readable medium storing executable instructions for causing the processor to perform operations comprising:
  - obtaining a first input signal to be output by the speaker;
  - determining a first volume level associated with the first input signal;
  - selecting a first Linkwitz Transform and a first multiband compressor from volume-dependent configuration data based on the first volume level;
  - generating a first intermediate signal by applying the first Linkwitz Transform to the first input signal to increase a low-frequency response of the speaker;
  - determining that at least a portion of the first intermediate signal exceeds a signal threshold of the speaker;
  - generating a first output signal by applying the first multiband compressor to the first intermediate signal by compressing the at least a portion of the first intermediate signal that exceeds the signal threshold of the speaker; and
  - driving the speaker to produce first audio output using the first output signal.

2. The data processing system of claim 1, the computer-readable medium including instructions configured to cause the processor to perform operations of:
- receiving a second input signal to be output by the speaker;
- determining a second volume level associated with the second input signal;
- selecting a second Linkwitz Transform and a second multiband compressor from the volume-dependent configuration data based on the first volume level;
- generating a second intermediate signal by applying the first Linkwitz Transform to the second input signal to increase a low-frequency response of the speaker;
- generating a second output signal by applying the second multiband compressor to the second intermediate signal by compressing the at least a portion of the second intermediate signal; and
- driving the speaker to produce second audio output using the second output signal.

3. The data processing system of claim 2, wherein the volume-dependent configuration data comprises a lookup table, and wherein to select the first Linkwitz Transform and the first multiband compressor from the volume-dependent configuration data the computer-readable medium includes instructions to cause the processor to perform operations of:
- identifying a lookup table entry based on the first volume level; and
- obtaining an identifier for the first Linkwitz Transform and an identifier for the first multiband compressor from the lookup table.

4. The data processing system of claim 1, wherein the first multiband compressor divides a frequency domain associated with the speaker into a plurality of frequency bands, and wherein to compress the at least the portion of the first intermediate signal the computer-readable medium includes instructions for compressing only frequency bands in which the portion of the first intermediate signal exceeds the signal threshold.

5. The data processing system of claim 4, wherein to generate the first output signal the first multiband compressor is configured to boost a gain of one or more frequency bands of the plurality of frequency bands by an amount less than or equal to an amount of headroom available for a respective frequency band.

6. The data processing system of claim 1, wherein to determine the first volume level associated with the first input signal comprises determining the first volume level based on a user-selected input.

7. A method for operating a speaker disposed within a sealed enclosure, the method comprising:
- obtaining a first input signal to be output by the speaker;
- determining a first volume level associated with the first input signal;
- selecting a first Linkwitz Transform and a first multiband compressor from volume-dependent configuration data based on the first volume level;
- generating a first intermediate signal by applying the first Linkwitz Transform to the first input signal to increase a low-frequency response of the speaker;
- determining that at least a portion of the first intermediate signal exceeds a signal threshold of the speaker;
- generating a first output signal by applying the first multiband compressor to the first intermediate signal by compressing at least a portion of the first intermediate signal that exceeds the signal threshold of the speaker; and
- driving the speaker to produce first audio output using the first output signal.

8. The method of claim 7, further comprising:
- receiving a second input signal to be output by the speaker;
- determining a second volume level associated with the second input signal;
- selecting a second Linkwitz Transform and a second multiband compressor from the volume-dependent configuration data based on the first volume level;
- generating a second intermediate signal by applying the first Linkwitz Transform to the second input signal to increase a low-frequency response of the speaker;
- generating a second output signal by applying the second multiband compressor to the second intermediate signal by compressing the at least a portion of the second intermediate signal; and
- driving the speaker to produce second audio output using the second output signal.

9. The method of claim 8, wherein the volume-dependent configuration data comprises a lookup table, and wherein selecting the first Linkwitz Transform and the first multiband compressor from the volume-dependent configuration data further comprises:
- identifying a lookup table entry based on the first volume level; and
- obtaining an identifier for the first Linkwitz Transform and an identifier for the first multiband compressor from the lookup table.

10. The method of claim 8, wherein the first multiband compressor divides a frequency domain associated with the speaker into a plurality of frequency bands, and wherein compressing the at least the portion of the first intermediate signal comprises compressing only frequency bands in which the portion of the first intermediate signal exceeds the signal threshold.

11. The method of claim 10, wherein generating a first output signal further comprises boosting a gain of one or more frequency bands of the plurality of frequency bands by an amount less than or equal to an amount of headroom available for a respective frequency band.

12. The method of claim 11, wherein determining the first volume level associated with the first input signal comprises determining the first volume level based on a user-selected input.

13. A machine-readable medium on which are stored instructions that, when executed, cause a processor of a programmable device to perform operations of:

obtaining a first input signal to be output by a speaker;

determining a first volume level associated with the first input signal;

selecting a first Linkwitz Transform and a first multiband compressor, from volume-dependent configuration data based on the first volume level;

generating a first intermediate signal by applying the first Linkwitz Transform to the first input signal to increase a low-frequency response of the speaker;

determining that at least a portion of the first intermediate signal exceeds a signal threshold of the speaker;

generating a first output signal by applying the first multiband compressor to the first intermediate signal by compressing the at least a portion of the first intermediate signal that exceeds the signal threshold of the speaker; and driving the speaker to produce first audio output using the first output signal.

14. The machine-readable medium of claim 13, further comprising instructions configured to cause the processor to perform operations of:

receiving a second input signal to be output by the speaker;

determining a second volume level associated with the second input signal;

selecting a second Linkwitz Transform and a second multiband compressor from the volume-dependent configuration data based on the first volume level;

generating a second intermediate signal by applying the first Linkwitz Transform to the second input signal to increase a low-frequency response of the speaker;

generating a second output signal by applying the second multiband compressor to the second intermediate signal by compressing the at least a portion of the second intermediate signal; and driving the speaker to produce second audio output using the second output signal.

15. The machine-readable medium of claim 14, wherein the volume-dependent configuration data comprises a lookup table, and wherein to select the first Linkwitz Transform and the first multiband compressor from the volume-dependent configuration data the machine-readable medium includes instructions to cause the processor to perform operations of:

identifying a lookup table entry based on the first volume level; and obtaining an identifier for the first Linkwitz Transform and an identifier for the first multiband compressor from the lookup table.

16. The machine-readable medium of claim 13, wherein the first multiband compressor divides a frequency domain associated with the speaker into a plurality of frequency bands, and wherein to compress the at least the portion of the first intermediate signal the machine-readable medium includes instructions for compressing only frequency bands in which the portion of the first intermediate signal exceeds the signal threshold.

17. The machine-readable medium of claim 16, wherein to generate the first output signal the first multiband compressor is configured to boost a gain of one or more frequency bands of the plurality of frequency bands by an amount less than or equal to an amount of headroom available for a respective frequency band.

* * * * *